United States Patent
Goel et al.

(10) Patent No.: US 7,600,681 B2
(45) Date of Patent: *Oct. 13, 2009

(54) LOW POWER WIRELESS DISPLAY TAG SYSTEMS AND METHODS

(75) Inventors: Anurag Goel, Foster City, CA (US); Sunit Saxena, Monte Sereno, CA (US); Mark Douglas McDonald, Campbell, CA (US); Ashwin Saxena, Monte Sereno, CA (US)

(73) Assignee: Altierre Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/504,262

(22) Filed: Aug. 14, 2006

(65) Prior Publication Data

US 2007/0040025 A1 Feb. 22, 2007

Related U.S. Application Data

(63) Continuation of application No. 11/019,705, filed on Dec. 20, 2004, now Pat. No. 7,090,125.

(51) Int. Cl.
*G06K 15/00* (2006.01)

(52) U.S. Cl. .................... 235/383; 235/492
(58) Field of Classification Search ................. 235/383, 235/441, 492, 493, 486, 487
See application file for complete search history.

(56) References Cited

U.S. PATENT DOCUMENTS

| 6,294,997 | B1 * | 9/2001 | Paratore et al. ......... 340/572.1 |
| 6,662,068 | B1 * | 12/2003 | Ghaffari ................ 700/115 |
| 6,677,852 | B1 * | 1/2004 | Landt .................. 340/10.1 |
| 6,712,276 | B1 * | 3/2004 | Abali et al. ............. 235/492 |
| 6,804,578 | B1 * | 10/2004 | Ghaffari ................ 700/229 |
| 7,082,344 | B2 * | 7/2006 | Ghaffari ................ 700/115 |
| 7,090,125 | B2 * | 8/2006 | Goel et al. ............. 235/383 |

\* cited by examiner

*Primary Examiner*—Thien M Le
(74) *Attorney, Agent, or Firm*—DLA Piper LLP (US)

(57) ABSTRACT

A low-power system for use with Wireless Display Tags (WDTs) includes, in one or more exemplary arrangements, various power management techniques, including receiver wake-up, RF logic sharing, RF repeaters and a frequency doubling power amplifier which operates on the absolute value of the input signal.

9 Claims, 9 Drawing Sheets

LOW POWER WIRELESS DISPLAY TAG SYSTEMS AND METHODS

RELATED APPLICATIONS

The present application is a continuation of U.S. patent application Ser. No. 11/019,705, filed on Dec. 20, 2004, now U.S. Pat. No. 7,090,125 and entitled "Low Power Wireless Display Tag Systems and Methods", which is related to the following co-pending applications filed concurrently herewith, assigned to the same assignee as the present invention, and incorporated herein by reference in full: U.S. patent application Ser. No. 11/019,660, entitled "An Error Free Method for Wireless Display Tag Initialization," U.S. patent application Ser. No. 11/019,978, entitled "Wireless Display Tag Unit," U.S. patent application Ser. No. 11/019,976, entitled "Wireless Display Tag (WDT) Using Active and Backscatter Transceivers," U.S. patent application Ser. No. 11/019,494, entitled "RF Backscatter Transmission with Zero DC Power Consumption," and U.S. patent application Ser. No. 11/019,916, entitled "Multiuser Wireless Display Tag Infrastructure and Methods."

BACKGROUND OF THE INVENTION

1. Field of the Invention

The present invention relates to electronic inventory systems adapted for use with electronic shelf labels, and more particularly relates to systems and methods for enabling communication among such shelf labels and a host system, including networks and systems which are adapted for wireless communication.

2. Description of Related Art

Referring to FIG. 1, retail stores typically display pricing information on paper labels located on shelf edges (shelf labels); FIG. 1 shows an example of a typical printed shelf label. Shelf labels are fitted into C-shaped channels at the edge of product display shelves. Typically, an in-store computer-based printing system downloads "Price Files" from a central location, such as a Retail Chain Headquarters. The information in Price Files is printed on shelf labels and these new shelf labels are manually inserted into the shelf C-channels, usually on a weekly basis. A typical large retail store must update thousands of shelf labels each week.

Referring now to FIG. 2, FIG. 3 and FIG. 4, some Electronic Shelf Labels (ESL) 10 have been produced in an effort to automate the shelf labeling process. As shown in FIG. 4, ESLs 10 display basic price information on a segmented liquid crystal display (LCD).

Referring to FIG. 2, ESLs 10 may receive display information by infrared (IR) or radio frequency (RF) communication 12. Current ESLs 10 often use unidirectional communications techniques to transmit data from the in-store computer-based pricing system to the deployed ESLs 10. Some ESLs 10 are capable of bidirectional communication, allowing the deployed ESLs 10 to send information or requests to the in-store computer system 14. Communication between an in-store computer system 14 and the deployed ESLs 10 is facilitated by one or more access points 16. Access points 16 are often located in the ceilings of the store.

However, the power requirements and limited range for typical prior an electronic shelf labels have led to serious shortcomings. In part, these shortcomings have resulted in prior art display tags extending beyond the shelf C-channels. In addition, such shortcomings have made it necessary to situate costly readers proximate to the tags, leading to costly networks which significantly limit the usability of RFID devices. In part, these shortcomings are associated with the power consumption of the transceiver contained within many such devices. In a typical prior art system, the power amplifier drives the antenna of the RFID device, and antenna power represents a substantial portion of the overall power consumed by the device. In such devices, the input waveform typically has little effect on the output waveform when the input amplitude is less than the turn-on voltage of the active device in the transmitter. In such arrangements, the waveform energy between the negative peak of the input waveform and the turn-on voltage of the active device is not only wasted, but can lead to undesirable parasitic losses.

Thus there has been a need for an RFID system which provides cost-effective, low power communication among electronic shelf labels and their associated host system without requiring excessive size.

SUMMARY OF THE INVENTION

The present invention provides a plurality of techniques and systems which optimize low power operation of RFID devices, thereby overcoming many of the limitations of the prior art and enabling the cost-affection production and implementation of a low-profile Wireless Display Tag (WDT) that fits within the confines of shelf-edge C-channel on a retail store display shelf, or, alternatively, can be used as a hang tag for other items.

In particular, the present invention provides methods and techniques for managing the power consumption of each WDT, including powering down those portions of the WDT not needed at a particular time or for a particular operation. Other techniques include establishing appropriate threshold signal levels for waking up high-power-consumption portions of the WDT electronics, in particular the receiver, and optimizing the duration of operation of such high-power-consumption portions, including operating in short bursts and transmitting ID information early in the communications protocol.

In addition, the present invention provides for sharing of high-power-consumption devices across multiple WDTs, thereby significantly reducing power consumption and cost since such devices typically represent significant costs as well as high power consumption.

Further, the present invention provides for low power, low cost repeaters which may be strategically placed in locations requiring WDTs to be read. Such repeaters typically will pick up weak uplink signals from the WDT devices, and then boost and retransmit those signals to either the host system, either directly or through intermediate devices such as access points.

In addition, a power amplifier may be provided which is driven with the absolute value of the input waveform, thus minimizing power waste and avoiding detrimental parasitic effects. In at least some implementations of such techniques, the frequency of the power amplifier can be reduced, for example halved, to provide further power reduction.

It will be appreciated that not all of the foregoing aspects of the present invention are required to be implemented in each embodiment, and thus various implementations may include selected aspects of the invention to provide solutions which are optimized for each particular application of the system and WDT of the present invention,

DETAILED DESCRIPTION OF THE INVENTION

Figure 1:
FIG. 1 shows a prior art example shelf label printed on paper.
Figure 2:
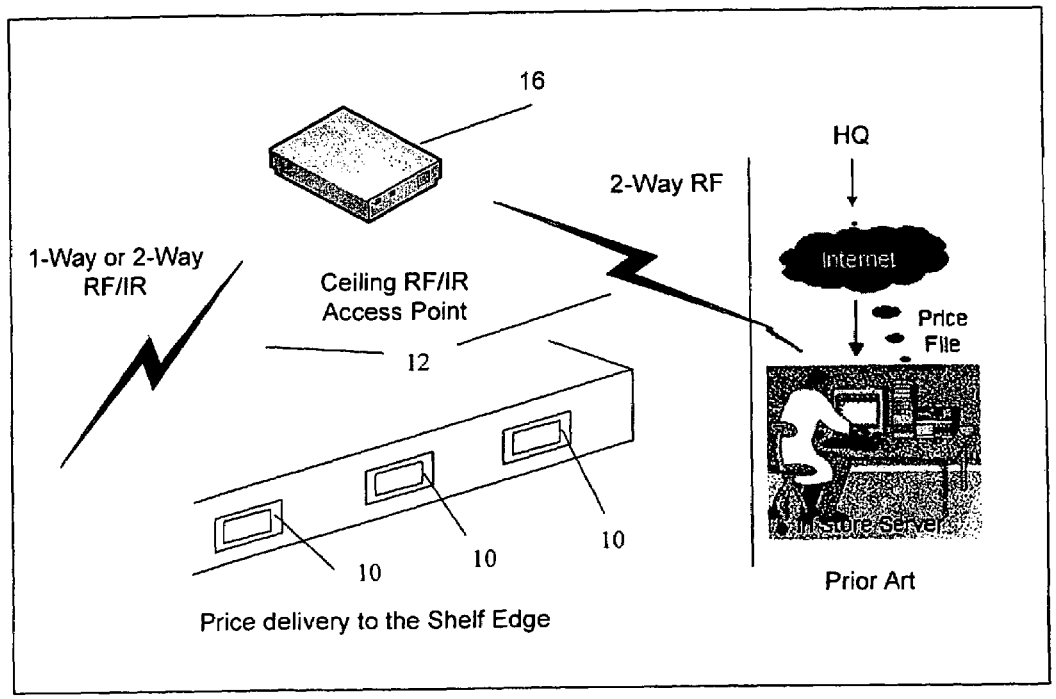
FIG. 2 shows how price information may be transferred from central computers to ESLs by RF or IR transmission.
Figure 3:
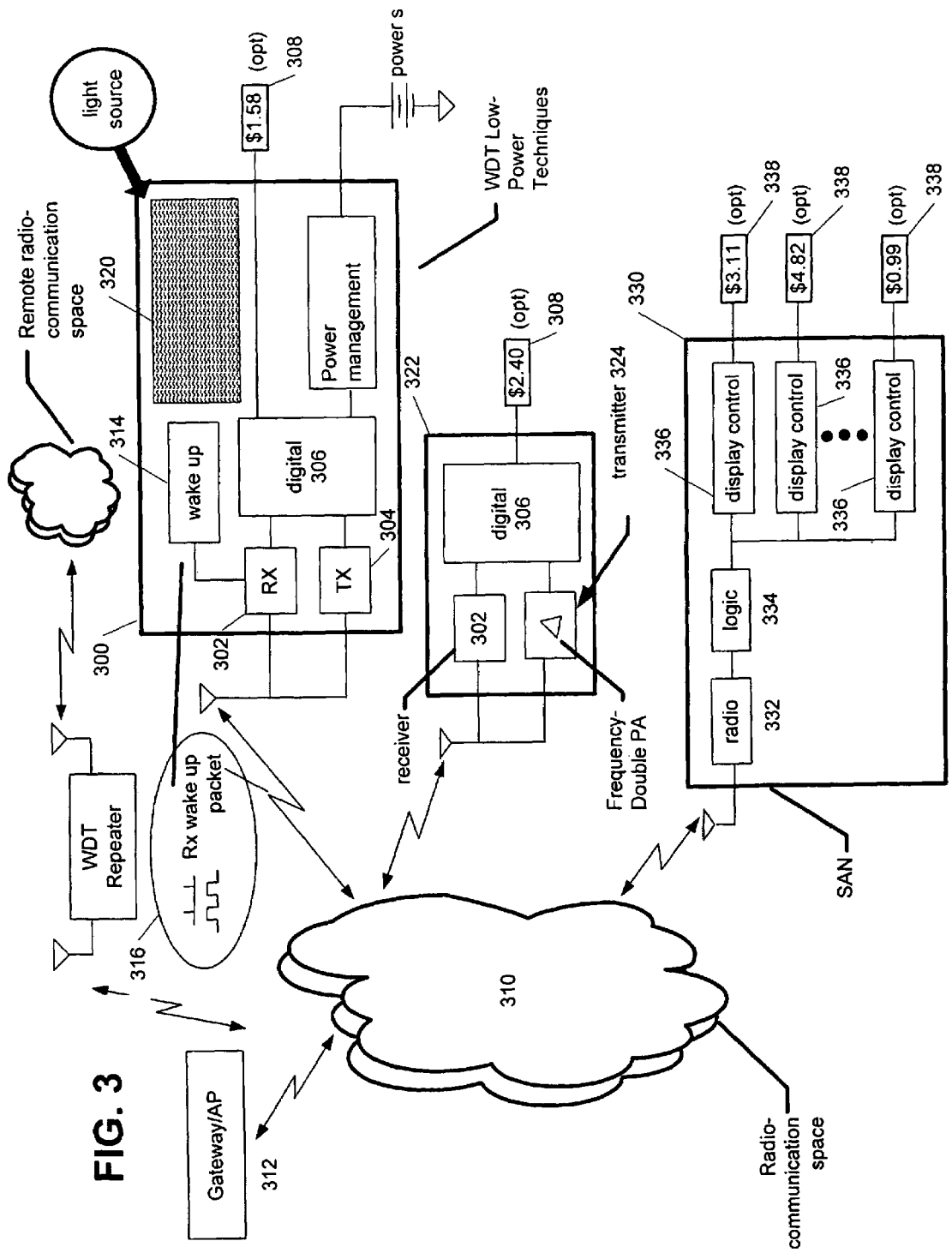
FIG. 3 shows a system in accordance with the present invention, including several of the novel aspects of the present invention.

Referring first to FIG. 3, a system in accordance with the present invention is illustrated. In particular, numerous aspects of the present invention are illustrated in a robust exemplary implementation, although it will be appreciated by those skilled in the art that not all of these aspects of the inventions are necessarily included in every implementation. A wireless display tag (WDT) 300 comprises a receiver 302 and transmitter 304, which may be integrated as a transceiver in at least some embodiments. Digital logic 306 handles communications and also manages the functions of the WDT, as described in the related applications, including driving a display 308. In a typical arrangement, the communications between the WDT and an associated host [not shown] are wireless and occur through radio space 310. The communications with the host may be received by a gateway or other access point 312. The WDT 300 may also include wake up circuitry 314, which responds to an appropriate incoming signal, such as shown at 316, to cause the receiver 302 or other portions of the digital logic 306 to wake up as discussed hereinafter in connection with FIGS. 4 and 5. The receiver 302 is typically caused to wake up for the purpose of receiving data packets as shown at 316. In an exemplary arrangement, power management logic may also be provided for managing the shut-down of portions of the digital logic, or otherwise optimizing power consumption in the WDT. A solar cell 320 may be provided as a source of power for the WDT 300, although power from the solar cell may be supplemented by a rechargeable or other battery, or by a wired connection. A light source 321 may be of any suitable type, including either natural or artificial light.

In an alternative arrangement, a WDT 322 may include a receiver 302 and a transmitter 324, which may again be integrated in at least some arrangements and utilize the communications techniques described in the related applications. In addition, the transmitter 324 may be a frequency doubling amplifier such as discussed hereinafter in connection with FIGS. 12 and 13. The WDT 322 typically includes digital logic 306 which in turn typically drives a display 308.

A still further alternative arrangement is shown with RF controller 330, which may include a transceiver for wireless communications with the host through radio space 310 and, in some embodiments, a gateway 312. The RF controller 330 typically includes a transceiver or radio 332 which communicates with logic 334. The logic 334 manages communications between the host and the RF controller 330, and also drives multiple display controls 336, each of which may have associated therewith a display 338, The operation of the RF controller 330 operates as discussed hereinafter in connection with FIGS. 6-9.

Referring next to WDT repeater 350, such a repeater may be used to boost and retransmit signals from the WDTs 300, 322 and/or 330, as discussed hereinafter in connection with FIGS. 10 and 11. The repeater 350 typically communicates wirelessly with the WDTs and also with the host or Gateway 312. It will be appreciated that like numerals are used for like elements to simply discussion.

Figure 4:
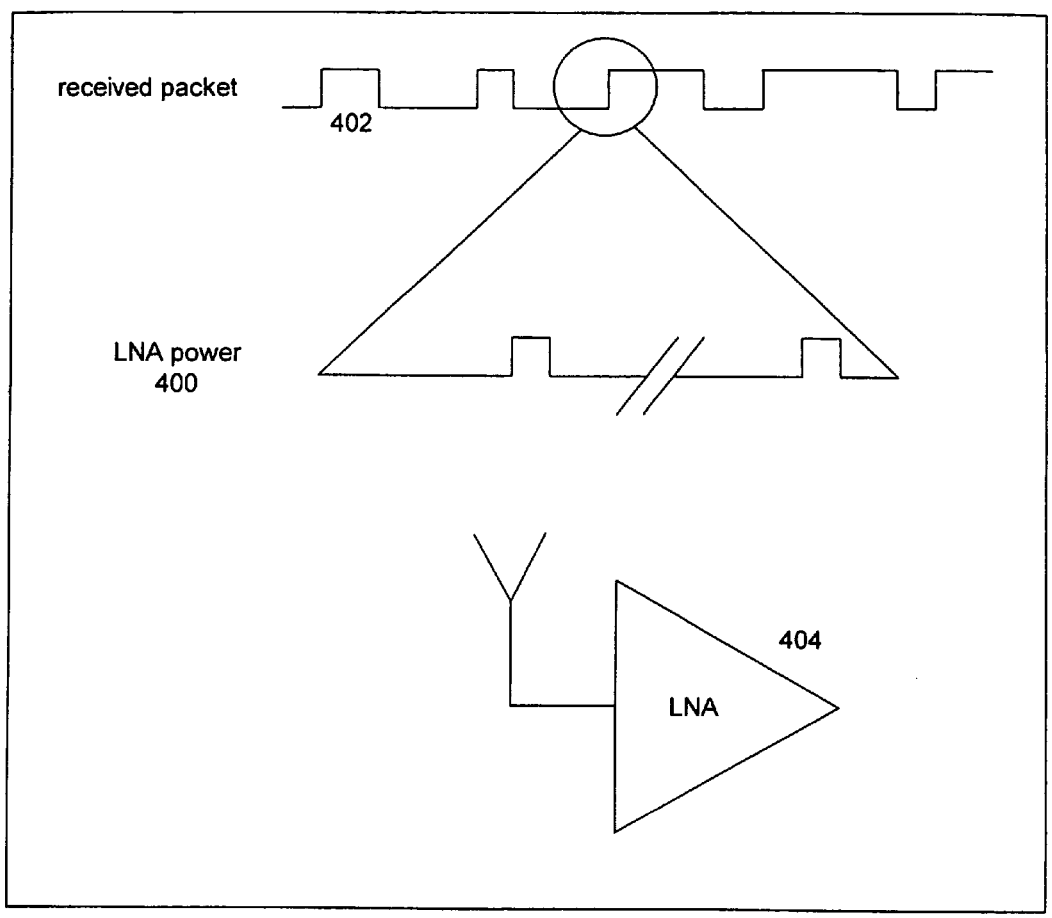
FIG. 4 shows in schematic form a pulsed receiver capable of burst operation in accordance with one aspect of the invention.

Referring next to FIG. 4, a pulsed, or burst-mode, receiver 302 is shown in greater detail, together with an appropriate waveform for waking up the receiver 302. The wake-up process may include pulsing the LNA power as shown in the waveform 400 in response to an appropriate edge or other portion of the packet train 402. The result is that the LNA 404 is powered up only during the appropriate period when the LNA is receiving packets, which may or may not be destined for the WDT. It will be appreciated that the receiver is turned on only for short bursts. For example, typical modern RFIC circuits can be turned on for a few nanoseconds, which is sufficient to determine if the desired signal is present This permits the time that the circuit is on to be short, so that time-average power consumption is significantly reduced. The time span of the received bits is much longer, for example on the order of microseconds. This yields a factor on the order of 1000 between receiver on time and bit time, which permits significant power savings.

The packets 402 are arranged so that the WDT ID occurs early on in the packet. Therefore, each WDT knows promptly if the incoming packets are destined for it, and can either remain powered up or power back down depending on whether that WDT is the destination for the incoming packets.

In addition, a solar cell may be provided in addition to a battery, and is usually sufficient to power the digital circuitry and the display if the lighting is sufficient. The solar cell may also provide supplemental power for circuitry that has a higher instantaneous current demand, for example the RF and analog circuitry. A switching regulator with capacitive or inductive storage elements can be used to provide power for the WDT to meet the requirements of circuits with high instantaneous power demands, but low average-power demands.

Figure 5:
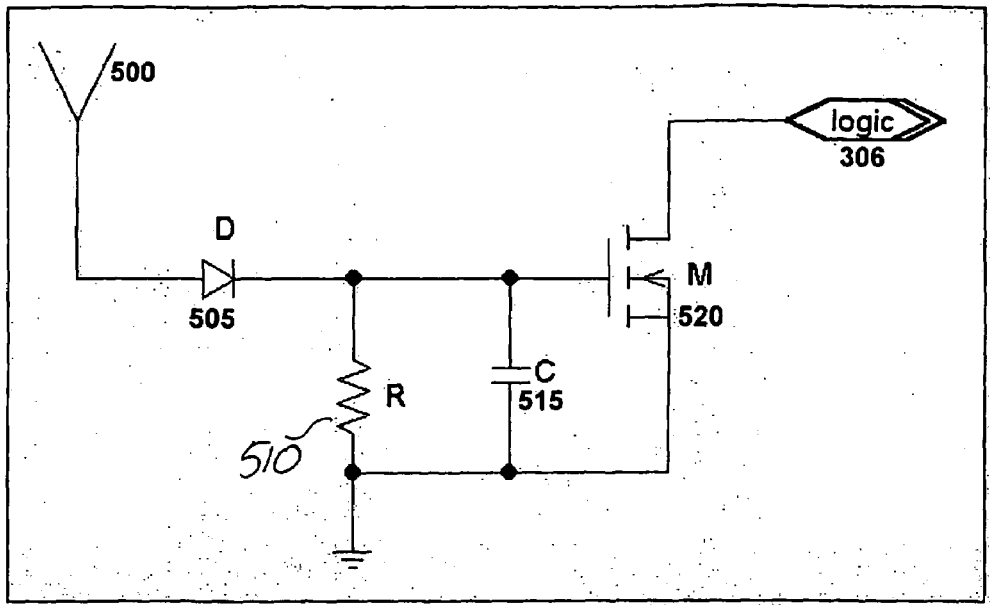
FIG. 5 shows in schematic form a design for a signal threshold detector for turning on a receiver in response to a sufficiently large signal, in accordance with another aspect of the present invention.

Referring next to FIG. 5, a circuit for providing a WDT with a deep-wake-up mode is illustrated. The implementation shown offers the additional feature that the receiver shown consumes no DC current. In operation, a sufficiently large (eg., 2 $V_{pp}$ or 10 dBm) radio signal is received on the antenna 500, which is then rectified by the diode 505. The signal is then integrated by the RC circuit of resistor 510 and capacitor 515. The FET 520 receives the integrated signal which turns on the FET and in turn signals the digital logic 306. The logic 306 then turns on the receiver 302, which determines whether the incoming signal is indeed a wake-up signal destined for that WDT. If so, the WDT is wakes up, or is enabled. If not, the WDT goes back to sleep and waits for the next wake-up signal. It will be appreciated that, although a FET 520 is shown in FIG. 5, numerous other devices will provide the same function, including a BJT, HBT, and so on.

Figure 6:
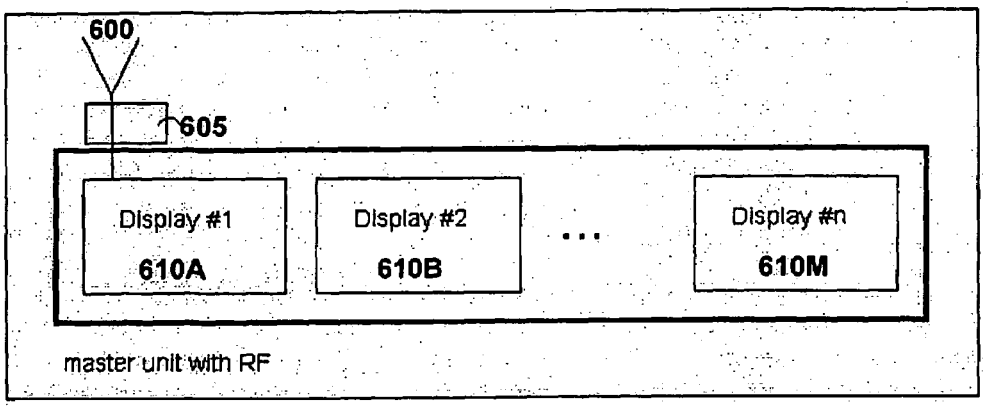
FIG. 6 illustrates in block diagram form a WDT in accordance with the present invention in which a single RF portion is shared among multiple display tags all housed within a common housing.
Figure 7:
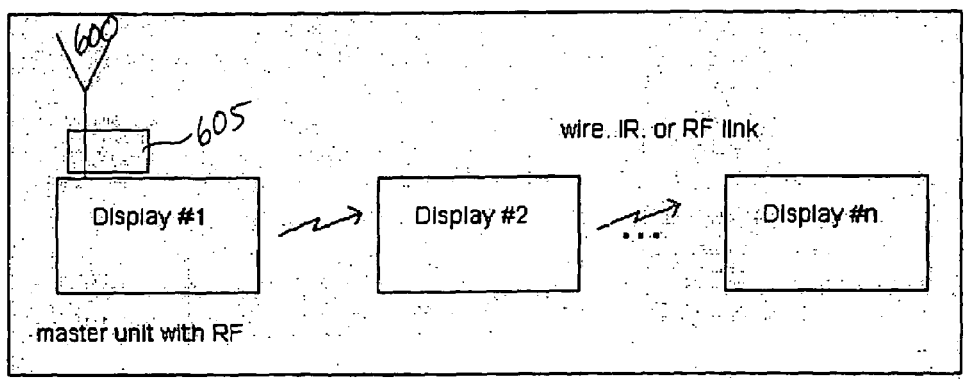
FIG. 7 illustrates an alternative to the arrangement of FIG. 6 in which a master WDT, which includes a relatively high power RF transceiver, communicates with other proximately located display tags in accordance with any of a group of communications techniques, including wired, IR or low power RF.

Referring next to FIGS. 6 and 7, an arrangement is shown where a single RF controller is shared among multiple WDT's, either housed together [FIG. 6] or housed separately [FIG. 7]. The configuration of FIG. 6 includes an antenna 60 which supplies an incoming signal to a single RF controller 605 with associated digital logic which drives a plurality of display devices 610A-n housed within a single housing. The configuration of FIG. 7 includes an antenna 600 which supplies a single RF controller 605. The controller and associated logic in turn control a plurality of discrete displays 610A-n. The configuration of FIG. 6 offers the advantage of having numerous displays within a very limited spaces, such as for crowded shelves, and also offers the power and cost savings associated with having only one receiver. The configuration of FIG. 7 offers the advantage of discrete displays which may be separately disposed even if relatively proximate to one another, all served by a single RF controller. The displays may communicate by wired, wireless or IR techniques known to those skilled in the art. In either configuration, it will be appreciated that the sharing of an RF controller with multiple displays essentially provides a shelf area network, with significant cost and power savings.

Figure 8:
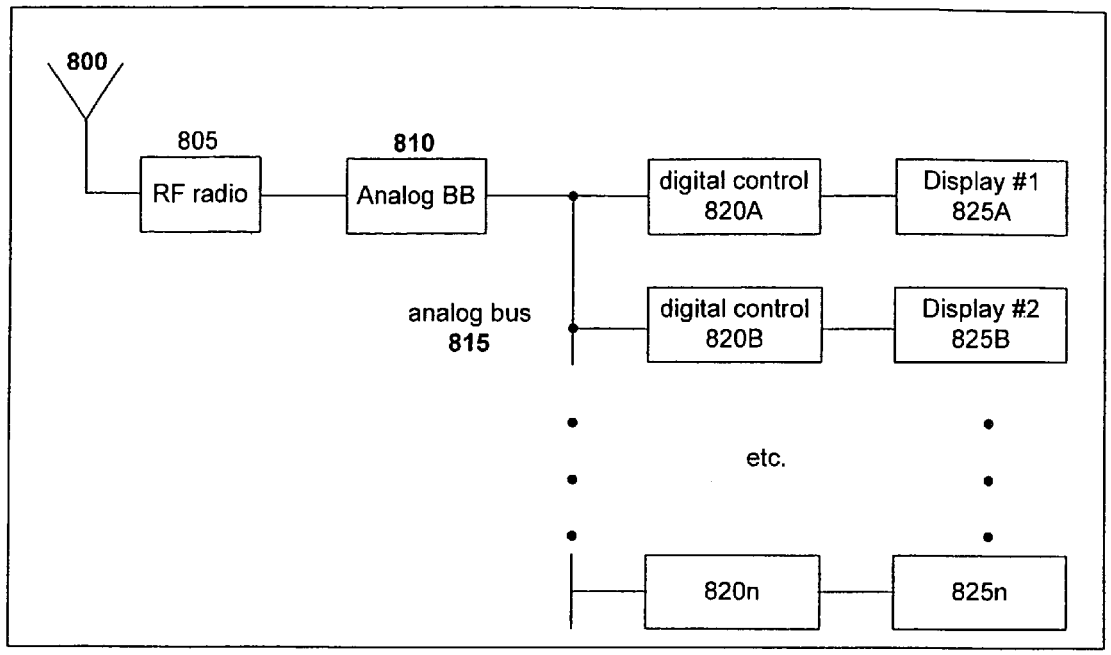
FIG. 8 shows in schematic form the aspect of the invention show in FIGS. 6 and 7 wherein the internal communications bus in an analog bus.
Figure 9:
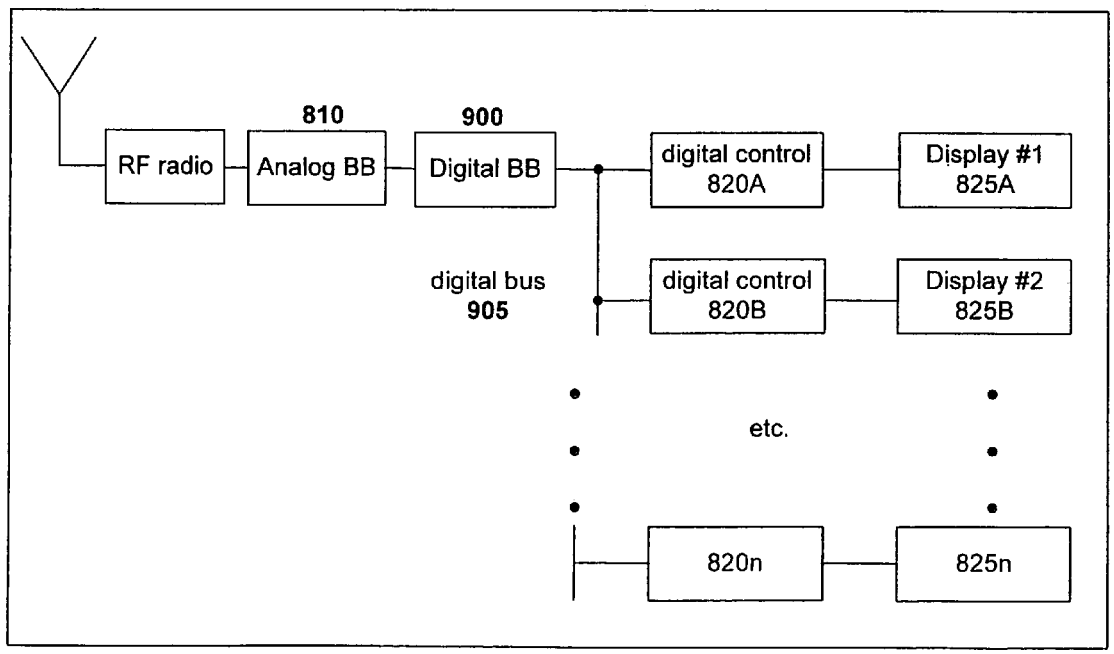
FIG. 9 shows in schematic form the aspect of the invention show in FIGS. 6 and 7 wherein the internal communications bus in a digital bus.

Referring next to FIG. 8, another feature of the design of FIGS. 6 and 7 may be better appreciated. In the design of FIG. 8, an antenna 800 feeds an RF receiver 805, which in turn feeds an analog BB 810. At this point, the analog signal is distributed across an analog bus 815, which communicates with digital controls 820A-n. The digital controls provide input to the displays 825A-n. Referring next to FIG. 9, a similar design is shown, but with a digital bus. To simply discussion, like reference numerals are used for like elements. In FIG. 9, a digital BB 900 receives an input signal from analog BB 810, and converts that signal to digital form for distribution on a digital bus 905. The bus 905 supplies appropriate signals to display controllers 820A-n and displays 825A-n.

Figure 10:
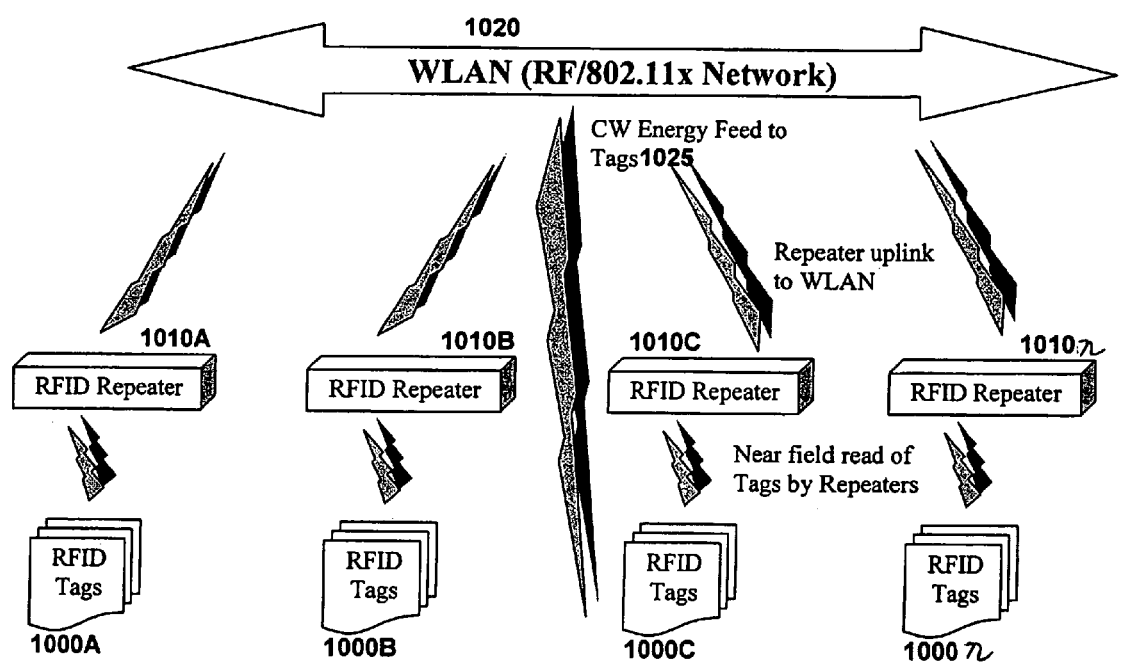
FIG. 10 illustrates an aspect of the invention in which repeaters are used to boost and retransmit signals from WDTs to a host system.
Figure 11A:
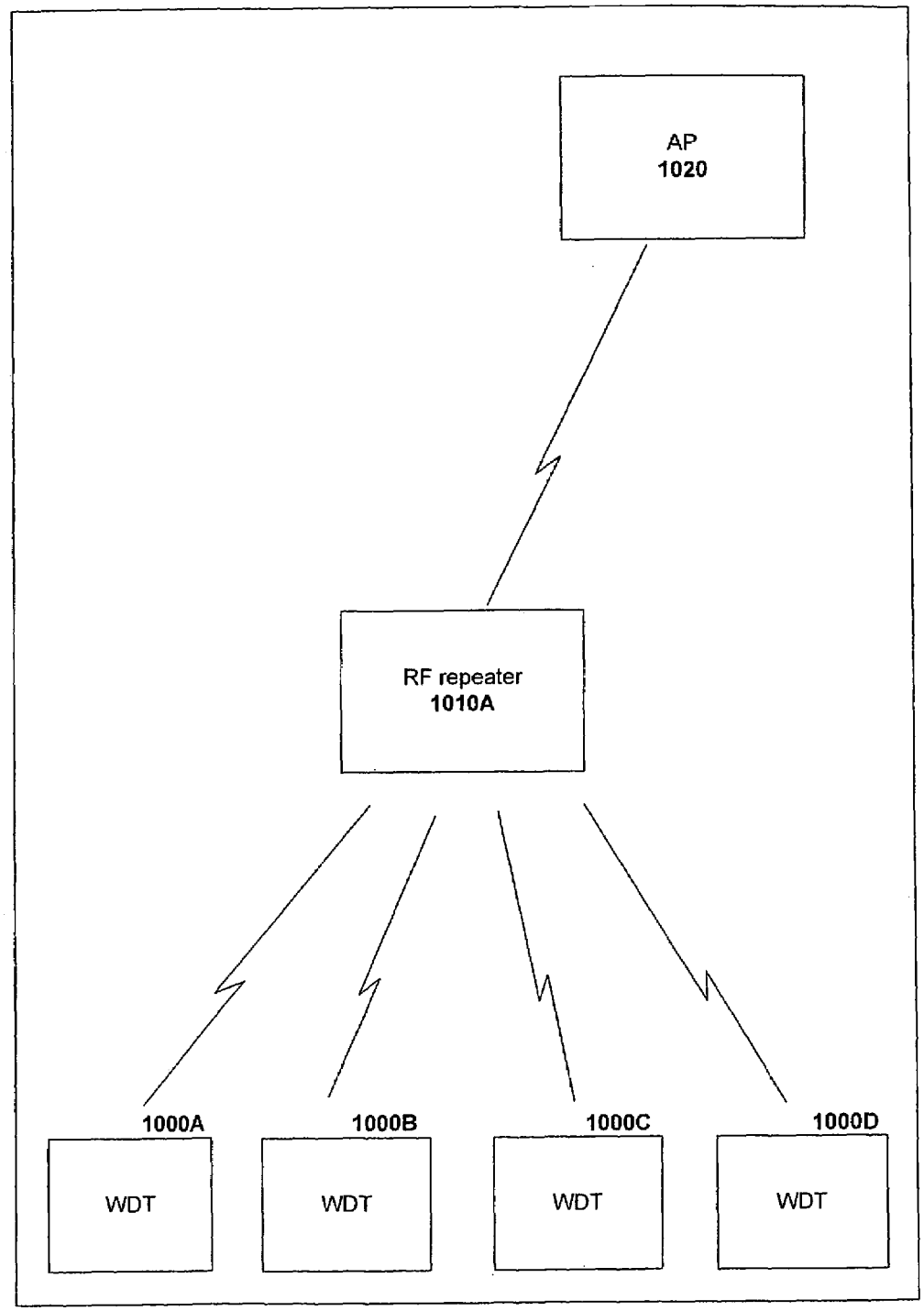
FIG. 11 illustrates a repeater in accordance with the present invention.
Figure 11B:
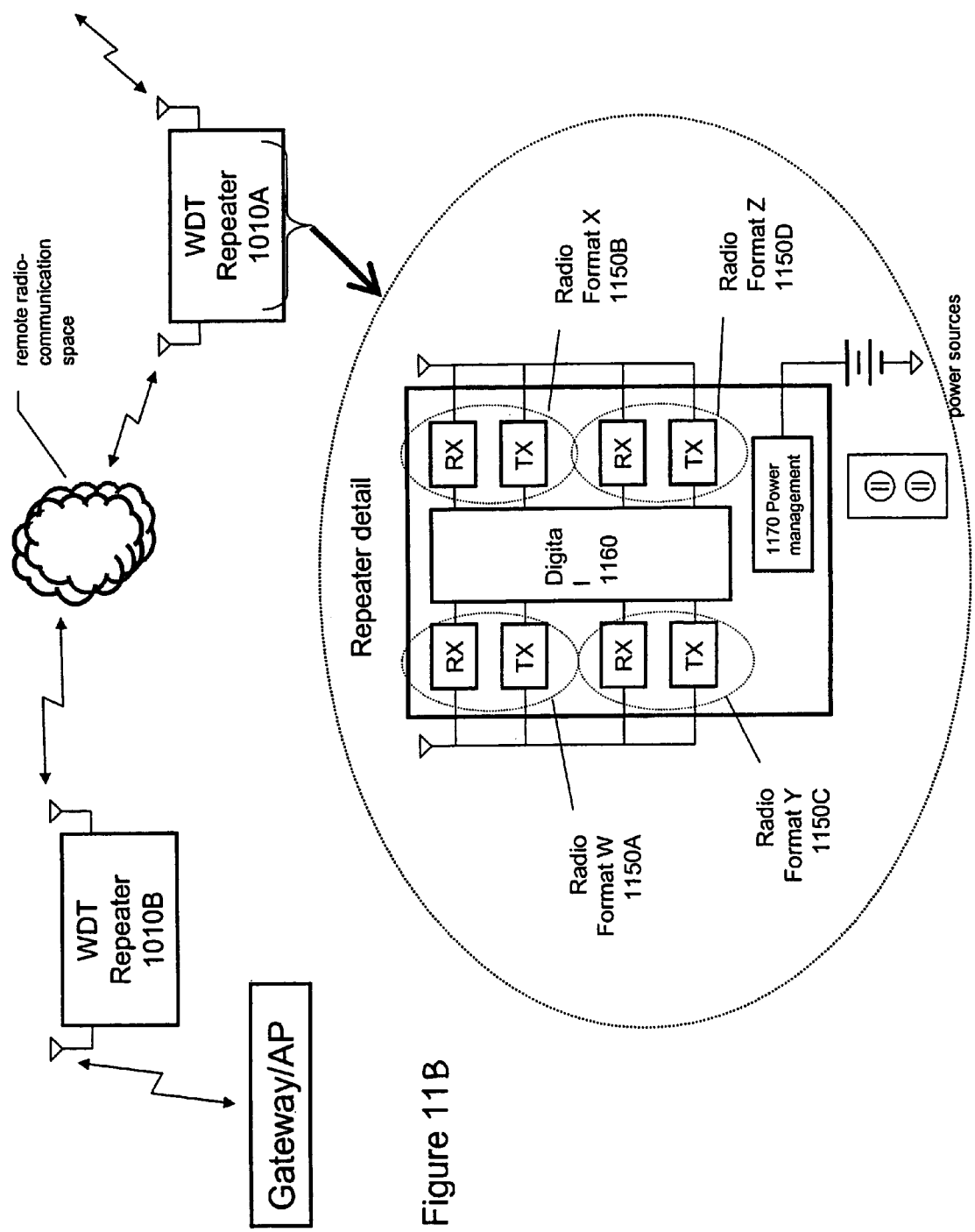

FIG. 10 illustrates in schematic diagram form the use of a powered RF repeater to reduce the number of expensive readers required for a typical sales or other inventory-management environment. In the arrangement of FIG. 10, a plurality of groups of WDTs 1000A-1000n are distributed throughout the managed environment. Each group of WDTs communicates wirelessly with an associated one of a group of RFID repeaters 1010A-1010n, where each repeater can perform a near-field read of the associated WDTs. The RFID repeaters 1010A-1010n in turn provide a repeater uplink to a central receiving station 1020 such as an access point or other device having LAN connectivity to the host server [not shown]. The link to the receiving station 1020 may be wired or, if wireless, may be any wireless protocol such as 802.11x. If the WDTs operate in backscatter mode, a continuous wave ("CW") signal may continue to be provided by the access points as shown at 1025, rather than the repeaters, thus simplifying the design of the repeaters and reducing their cost, In addition, in some implementations, the repeaters operate bidirectionally to retransmit signals from the access points to the WDTs. Such an arrangement is illustrated in FIG. 11, in which like elements have like reference numerals from FIG. 10. It will also be appreciated that the RFID repeaters 1010A-n may communicate with the RFID tags using a first protocol, and may communicate with the central receiving station or access point 1020 with a different protocol. For example, a repeater may listen to WDTs 1000A-n using the EPCglobal protocol in the 800-900 MHz range, while communicating with the central station 1020 in the 2.4 GHz, 5.7 GHz or other suitable band. For example, communication with the central station 1020 may be in accordance with the IEEE 802.11 standard.

Repeaters 1000A-n have several advantages, depending upon the particular implementation. Repeaters are not required to fit within the C-channel or other limited configuration, and thus do not have the same form factor constraints as WDTs. This permits the repeaters to use large batteries or other conventional power sources. In addition, if battery power is used, the batteries can be changed easily since far fewer repeaters that WDTs are required. Likewise, the repeaters can be produced cost effectively since they need only front-end discrimination of RF signals that need to be boosted and back-end signal boosters and retransmission.

In some implementations it may be desirable to boost the range of one or more of the access points, or to bring the effective range of access points close to the WDTs, by running a wire close to the WDTs, for example down a shelf of the managed environment. The wire can be implemented on a flexible printed circuit board with self-stick adhesive, or in any other suitable format. The wire can operate as a long wire antenna for the purpose of providing CW power for those WDTs that operate using backscatter transmission. Alternatively, many standard antennae may be used on the printed circuit board, including dipole, patch, and so on. One or more transmission lines printed on the printed circuit board can feed the antennae, or splitters can be used to couple to the antennae if only a single wire is used.

Figure 12:
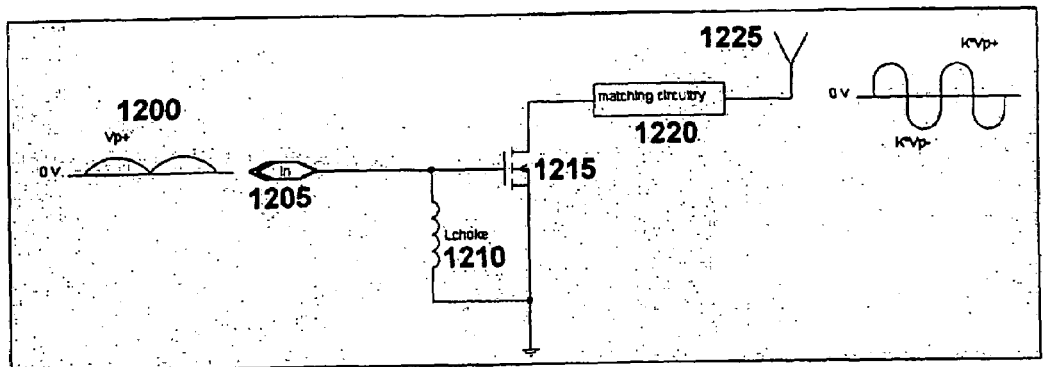
FIG. 12 illustrates in schematic form a power amplifier which operates on the absolute value of the input waveform, in accordance with yet another aspect of the present invention.
Figure 13:
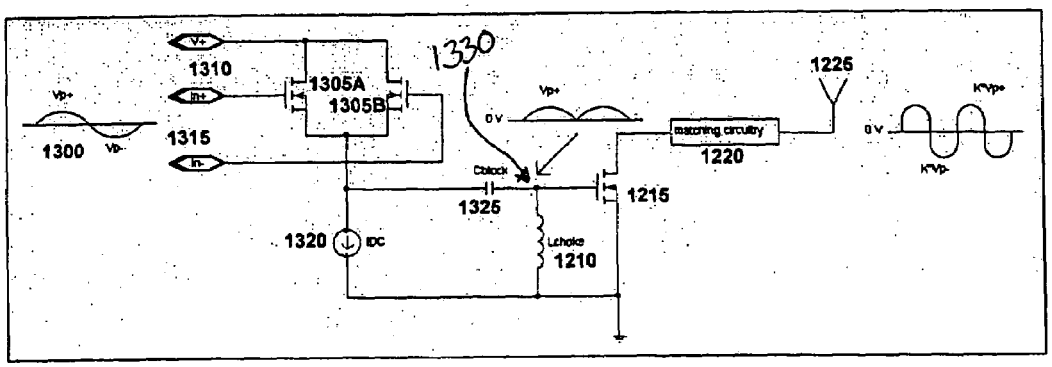
FIG. 13 illustrates in schematic form a frequency-doubling power amplifier which operates on the absolute value of the input waveform.

Referring next to FIGS. 12 and 13, a power amplifier such as shown at 324 (FIG. 3) can be more fully appreciated. The absolute value of an input waveform 1200 is shown as an input to a node 1205, where an inductive choke 1210 controls the switching of a FET 1215. The output of the FET 1215 is provided to matching circuitry 1220 and then to the antenna 1225. Halving the frequency and driving the circuit with the absolute value of the input waveform 1200 provides improved efficiency of a Class B or Class C nonlinear power amplifier, and the input waveform pulses are restored by the output circuitry as shown in FIG. 12. This arrangement has the advantage that a smaller area of the waveform is wasted in nonlinear operation, and also produces less parasitic losses. Finally, the half frequency is easier to generate than the primary frequency.

Referring next to FIG. 13, the generation of the absolute value waveform can be better appreciated. A sinusoidal input waveform 1300 provides the input to a pair of differentially connected FETs 1305A-B, with one gate 1310 controlled by the positive going signal, and the other gate 1315 controlled by the negative-going signal. The sources of the FETs 1305A-B are connected to a current source IDC 1320, which is connected to ground at the other end. The sources of the FETs 1305A-B are also connected to one end of a blocking capacitor 1325, which is on its other end connected to the output node 1330 of the absolute value circuit. The signal at the node 1330 is the same as that shown as the input to FIG.

12. The remainder of the circuit can be seen to be the same as FIG. 12, and so is assigned like reference numerals.

Having fully described an exemplary embodiment of the invention, together with numerous alternatives and equivalents, it will be apparent to those skilled in the art that numerous additional alternatives and equivalents also exist which do not depart from the present invention. As a result, the foregoing description is for purposes of illustration, and the invention is to be limited only by the appended claims.

We claim:

1. A shelf-area network comprising:
a plurality of displays configured to fit at a shelf edge;
one or more shared radio frequency (RF) receivers adapted to receive transmissions for a host, the transmissions from the host comprising data for the displays; and
digital logic responsive to the one or more shared RF receivers for controlling the plurality of displays in accordance with the data from the host.

2. A shelf-area network, as recited in claim 1, further including a housing for enclosing the plurality of displays.

3. A shelf-area network, as recited in claim 1, further including a plurality of housings, each housing enclosing a display and each display further comprising control logic responsive to the digital logic for displaying the data on the display.

4. A shelf-area network, as recited in claim 3, wherein the digital logic communicates with the control logic of each display by wireless techniques.

5. A shelf-area network, as recited in claim 3, wherein the digital logic communicates with the control logic of each display by optical techniques.

6. A shelf-area network, as recited in claim 3, wherein the digital logic communicates with the control logic of each display by a wired connection.

7. A power management for tags comprising:
a host system for generating a wake up signal;
transmission means for communicating the wake up signal to a plurality of tags;
a tag including; wake-up logic for detecting the wake up signal, digital logic and a receiver circuit, the digital logic responsive to the wake-up logic for activating the receiver circuit, the receiver circuit determining whether the wake-up signal is for the intended tag based on a tag identifier in the wake-up signal.

8. A power management system for wireless tags comprising:
a plurality of wireless tags which transmit a near-field signal in accordance with a first protocol,
a central receiving station which communicates in accordance with a second protocol, and
at least one RF repeater, the RF repeater adapted to receive signals in accordance with the first protocol and to transmit signals in accordance with the second protocol.

9. A power management system for wireless display tags having a range of radio frequency (RF) communications comprising:
a plurality of wireless display tags which transmit a near-field signal in accordance with a first protocol,
a central receiving station which communicates in accordance with a second protocol, and
at least one radio frequency (RF) repeater, the RF repeater adapted to receive signals in accordance with the first protocol and to transmit signals in accordance with the second protocol, wherein the range of RF communications of the system is extended.

* * * * *